Figure 1:
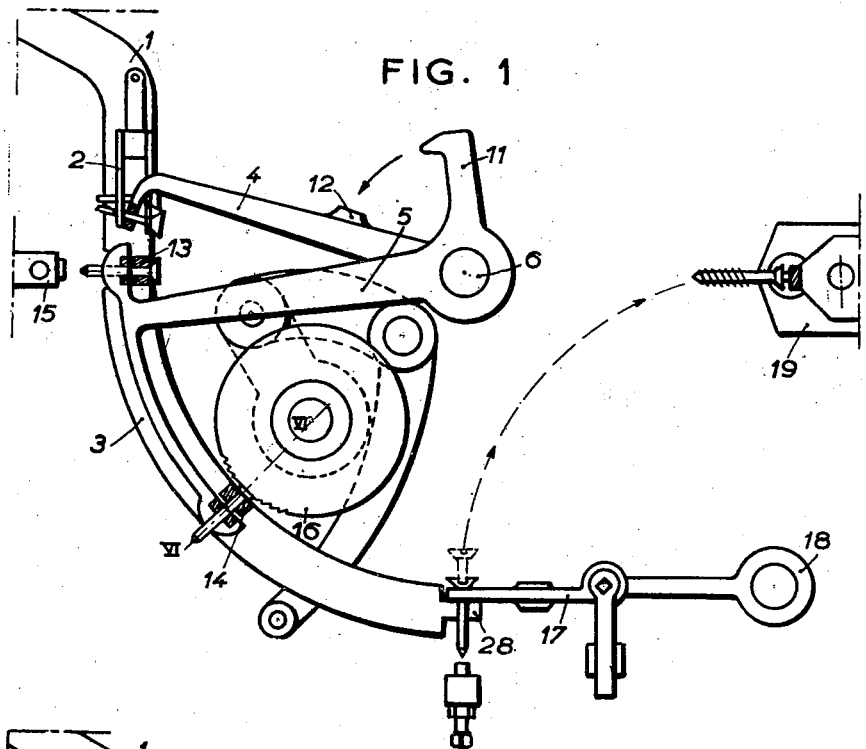

Jan. 15, 1952        L. VIELLARD        2,582,662

MACHINE FOR PRODUCING WOOD SCREWS

Filed July 18, 1946        2 SHEETS—SHEET 1

Inventor
Léon Viellard

Jan. 15, 1952     L. VIELLARD     2,582,662
MACHINE FOR PRODUCING WOOD SCREWS
Filed July 18, 1946     2 SHEETS—SHEET 2
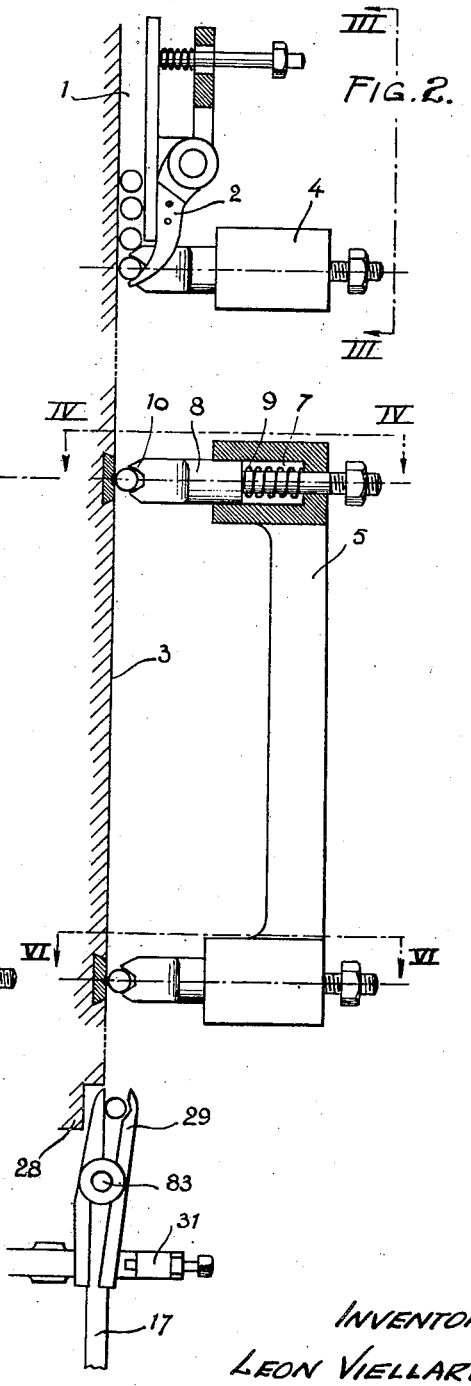
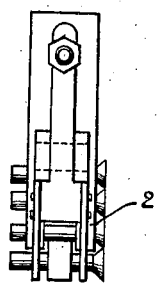
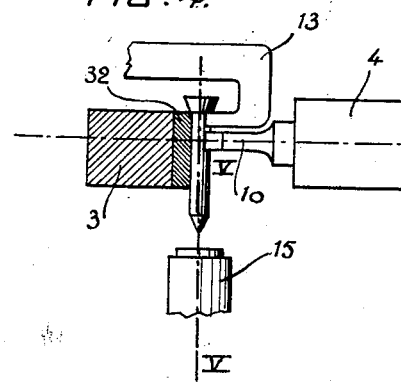
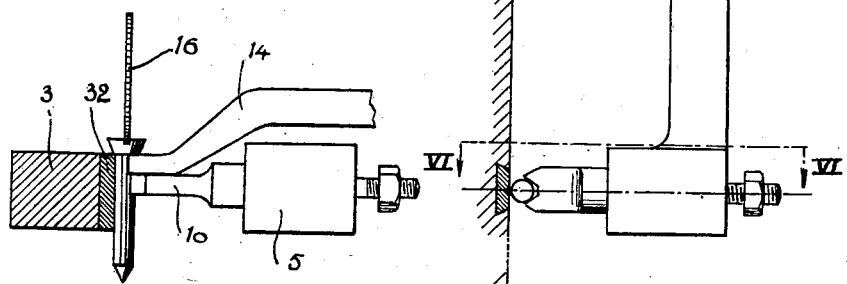
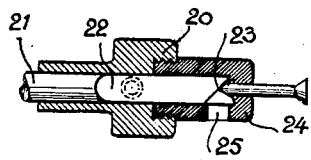
INVENTOR
LEON VIELLARD Patented Jan. 15, 1952

2,582,662

UNITED STATES PATENT OFFICE 2,582,662

MACHINE FOR PRODUCING WOOD SCREWS

Léon Viellard, Morvillars, France

Application July 18, 1946, Serial No. 684,527
In France May 9, 1946

4 Claims. (Cl. 10—5)

The present invention relates to machines for producing wood screws.

The production of wood screws with a slotted head requires a certain number of successive operations including stamping, lathe-turning, slotting and threading, often preceded by pointing of the tip. The lathe-turning step may be omitted when the stamped material is such that sufficiently well-finished blanks can be produced. In this case, after stamping, it is only necessary to effect the pointing, the slotting and threading.

The object of the present invention is to provide in a machine for producing wood screws, a device for feeding blanks to tools adapted to carry out said last-mentioned three operations in a continuous and automatic manner. This device effects the displacement of the blanks with great security from feed hopper to the successive tools with a reduced wear of the transmission members. This device is easily readjusted when the size of the screws is to be changed. Furthermore, the various mechanisms are readily accessible so that they may be easily inspected.

The accompanying drawings show a form of construction of the device according to the invention.

Figure 1A:
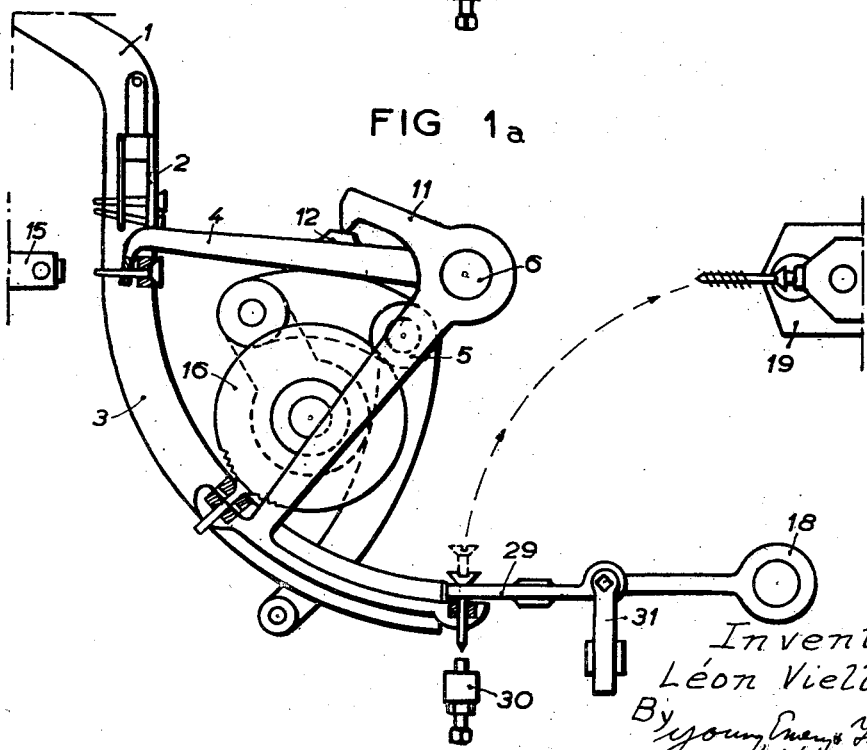

In the drawings:

Figure 1 is a diagrammatic elevational view of the machine in one stage of its operation, Fig. 1a is a view similar to that of Fig. 1 showing the machine at another stage of its operation, Figure 2 is a diagrammatic view showing the successive positions of the blank on the supporting sector, the latter being shown in linear development, Fig. 3 is a front view of the upper part of Fig. 2 taken on line III—III, Fig. 4 is a sectional view taken on line IV—IV of Fig. 2, Fig. 5 is a sectional view taken on line V—V of Fig. 4 but showing the pointing means performing a machining operation, Fig. 6 is a sectional view taken on the line VI—VI of Fig. 2.

The device according to the invention effects the travelling of the blanks received in a feed channel 1 successively to the tool for pointing, to the slotting cutter, then to the member which takes it over, leading it to the threading tool.

The device is shown in Figs. 1 and 1a in two successive stages of its operation which clearly illustrates the travelling of the blank over a circular sector 3 on which it is subjected to the successive operations.

The stationary circular sector 3 is provided at the lower end of the feed channel 1 and is fed by blanks positioned in this channel 1 and held by the yielding retainer 2. In front of the stationary sector 3 are arranged rocking arms 4 and 5 pivoted around the axis of pivot 6 concentric with the sector 1. At the free end of the arm 5 (Fig. 2) is provided a cylindrical recess 7 inside which slides a member of circular cross section 8 urged outwardly by a spring 9. The outer end of the member 8 is provided with a notch 10 having sloping sides for grasping a screw blank and elastically urging it against the sector 3. The system composed of the elements 7, 8, 9 and 10 forms an elastic feeler pressing the screw blank against the sector 3 during operations performed on the blank. The arm 4 carries one such feeler while the arm 5 carries two of them. In Fig. 2, the sector 3 is diagrammatically shown in side view and is developed to clarify the drawings. Actually, however, said sector is curved on a plane perpendicular to the plane of the drawing. The arms 4 and 5 provide for the progression of the screw, the body of which is held by the thrust of the springs 9 of the elastic feeler against the sector 3, the head of the screw remaining outside the sector on the inner surface thereof. The progression of the blanks is caused first by the arm 4 carrying a single elastic feeler as shown in Figs. 1 and 1a in the embodiment illustrated, and then by the arm 5 carrying two elastic feelers. The movements of the two arms are associated, the associating means therefor, in the case illustrated, comprising a lever 11 adapted to bear at the end of the stroke of the arm 5 against a suitable bearing member 12 on the arm 4 (Fig. 1). This association may, however, be ensured through any other suitable mechanical means.

Retaining levers 13 and 14, whose function will be disclosed hereinafter, cooperate with the sliding arm 5.

During their progression, the blanks removed one by one from the bottom of the channel 1 by the arm 4 are fed by the latter to the pointing device 15. After the pointing operation has been completed, the screw is removed by the arm 5 and is brought to the slotting means 16 for slotting the screw head, which means are located at the middle of the sector 3. Lastly, the screw removed by the second feeler on the arm 5 is led to the bottom of the sector where it is taken up by a lever 17 pivoting on a pivot 18 for bringing it to the threading chuck 19 shown in Figs. 1 and 1a.

In Figures 1 and 1a, the successive operations to which the blank is subjected are pointing, head-slotting and threading, but the sequence of these operations is not compulsory and may be modified. Thus, in particular, the pointing step may be effected after the slotting and simultaneously with the threading operation. Similarly, the means for feeding the screw is not necessarily used in conjunction with the machining means described and illustrated. It may be adapted to any other equivalent operations. Thus, the pointing may be omitted if the threading is operated with a cutter.

All these operations are ensured through rapid movements positively but smoothly effected so as to ensure a reliable progression of the screw from its position as a blank to the finished stage. The device according to the invention is applicable in machining of screws of any size, even as short as 10 to 20 mms. in length.

A screw is grasped by the arm 4 and is removed by it from engagement with the yielding retainer 2 and brought in front of the pointing tool 15 while sliding over the sector 3 against which it is held by the yielding feeler 10 of the arm 3 (Fig. 1). In the last-mentioned position, clamp 13 urges it firmly against the sector 3 against which it is held in position as shown in Fig. 1a. In this position, the screw is held fast, and its tip is subjected to the action of the pointing tool which caps it as shown in Figs. 4 and 5. Said pointing tool comprises a chuck 20 within which is secured a rod 21 carrying the tool, the latter including a semi-circular part 22 ending in a bevel tip 23. The end of the tool is provided with a cap 24 screwed over the chuck 20, and formed with a centering aperture for the screw. An opening is provided at 25 in the cap 24 in the side wall facing the cutting edge 23 for discharge of the cuttings. The screw being held fast, the tool 15 comprising the elements 20 to 25 is brought in front of it to perform a pointing operation thereon.

When the pointing is completed, then the arm 5 assumes the position illustrated in Fig. 1 and its upper feeler fits over the screw as shown in side view in Fig. 2. A rotation of the arm 5 brings it into its second operative position corresponding in the present case to the head-slotting step, which position is illustrated in Figures 2 and 6. In this position, the screw is forcibly urged against the sector 3 by the retainer lever 14. Once it is thus held fast, the head of the screw is subjected to the action of a cutter 16. The structure including the cutter and its carrier is arranged in a manner such that the axis of rotation of the cutter may lie along the radius drawn from the center of the pivot 6 of the arms to the location of the screw. Thus the cutter forms in the head of the screw a slot the bottom of which does not differ much from a straight line.

In the machining positions, the stationary circular sector 3 may have separate elements secured thereto as shown at 32, said elements being made of a more resistant metal or of any other suitable wear resisting material which makes it easier to retain the screws in front of said positions.

During the cutting operation, the arm 5 returns to its position of Fig. 1 and takes hold of a further screw through its upper feeler. Its second or lower feeler bears against the screw which has just been slotted and is held in place by the lever 14. As the latter recedes, rotation of the arm 5 leads the slotted screw to its lower position. At this point, the sector 3 is recessed and has a single tooth 28 against which the body of the screw is held. The screw is then gripped by a clamp 29 carried by the lever 17 which is mounted to pivot about the axis 18. Upon swinging the arm 17 about its pivot axis 18, the screw carried by clamp 29 is shifted to the threading chuck 19. As apparent from Figures 1 and 1a, the feeler passes behind or underneath the clamp 29 so that the screw remains urged against the surface of the tooth 28. As the arm 5 moves back, a rod 30 pushes the screw away from sector 3 slightly as shown in dotted lines while the clamp 29 remains stationary, which consequently allows the chuck 19 to easily take hold of the screw.

As shown, clamp 29 comprises a pair of jaws pivotally mounted on arm 17 about pivot 83. The jaws of clamp 28 are actuated by a mechanism 31.

As is apparent, the movements of the arms 4 and 5 are correlated. The arm or slider 5 provided with two yielding feelers brings a screw from its pointing position 15 to its slotting position 16 while the preceding screw is led from the slotting position 16 to the gripper 29 which is to lead it to the tapping or threading means 19. The arm 4 controlled at the end of its stroke by the arm 5 through the agency of the part 11 bearing against the surface 12 of the arm 4, takes hold of a screw in the feed channel 1 and brings it to its pointing position. The passage from one position to the other for each of the arms 4 and 5 is effected by releasing the screw which it has just carried along and which is held fast at this time by retainer levers 13 and 14. This operation is effected through the resiliency of the feelers 10 urged by the spring 9 and is facilitated by transverse movement in a direction perpendicular to the plane of Figure 1 in the direction of the pivot shaft 6.

Having now described my invention, I claim:

1. In a woodscrew-making machine including a pointing tool, a slotting cutter tool, and a threading tool to which tools screw blanks are successively fed over a delivery channel, blank feeding means which comprises a fixed sector in the form of part-circumferential annulus over and against which said blanks are caused to slide as they progress from said pointing to said slotting tool, then from said slotting to said threading tool, an arm adapted to rock about an axis coaxial with said fixed sector, resilient feeler means on said arm applying said blanks against said sector and causing them to slide over the sector during their said progress, and retainer levers clamping said blanks against said fixed sector to block said blanks thereagainst throughout the idle return stroke of said rocker arm to its initial position.

2. In a woodscrew-making machine which includes a pointing tool, a slotting milling-cutter tool and a threading tool, feed means for feeding said blanks from a blank-delivery channel to a pointed-and-slotted-blank take-up means adapted to convey said pointed-slotted-blank to said threading tool, said feed means comprising a fixed sector in the form of a part-circular annulus over which the blanks slide during their progress from said pointing to said slotting tool then from said slotting tool to said take-up means, a rocker arm rockable about an axis coaxial with said sector yielding feeler means on said arm applying said blanks against said fixed sector during their said progress from said pointing to said slotting tool and from said slotting tool to said take-up means, and retainer clamps clamping said blanks against said sector to block them as they are machined by said tool while said rocker arm returns to its initial position without moving said blanks.

3. In a woodscrew cutting machine which includes a pointing, a slotting milling-cutter and a threading tool and feed means for feeding said blanks from a delivery channel to said tools in succession, said feed means comprising a sector in the form of a quarter of a circumference over which said blanks are adapted to slide during their said feed progress, a rocker arm rockable about an axis coaxial with said sector and yielding feeler means on said arm applying said blanks against said fixed sector and moving them from each said tool to the next, and retainer clamps clamping said blanks against said fixed sector to block them while they are being machined by said tools, during the idle return stroke of said rocker arm.

4. In a woodscrew-making machine with means for successively pointing, slotting and threading a number of blanks, a pointing tool, a slotting milling cutter and a pivotal take-up lever for taking up the pointed and slotted blank and advance it to the threading means, respectively arranged at the top, at an intermediate point of, and at the bottom of a fixed sector in the form of a quarter-circumference, said sector arranged at the outlet from and as an extension of a delivery channel, said sector constituting a backing surface for said blanks throughout their sliding progress from one of said tools to the next, a reciprocable arm adapted to rock about the center of said fixed sector, two yielding feelers on said arm each applying a blank against said sector and slidingly advancing it over said sector from said pointing to said slotting means and from said slotting means to said take-up lever respectively, and retainer clamps blocking said blanks against said sector as they are being machined, while said rocker arm recedes without driving any blanks therewith.

LÉON VIELLARD.

REFERENCES CITED

The following references are of record in the file of this patent:

UNITED STATES PATENTS

| Number | Name | Date |
|---|---|---|
| 468,524 | Phillips | Feb. 9, 1892 |
| 580,171 | Allen | Apr. 6, 1897 |
| 948,200 | Avery | Feb. 1, 1910 |
| 1,253,631 | Rodd | Jan. 15, 1918 |
| 1,682,646 | Weber | Aug. 28, 1928 |
| 2,339,807 | Rau | Jan. 25, 1944 |

FOREIGN PATENTS

| Number | Country | Date |
|---|---|---|
| 276,891 | Great Britain | Sept. 8, 1927 |